May 11, 1965  F. DVORACEK  3,183,292
PLASTIC MOLDING APPARATUS AND METHOD
Original Filed Sept. 30, 1958  2 Sheets-Sheet 1

FRANK DVORACEK
INVENTOR.

By His Attorneys
HARRIS, KIECH, FOSTER & HARRIS.

May 11, 1965    F. DVORACEK    3,183,292
PLASTIC MOLDING APPARATUS AND METHOD
Original Filed Sept. 30, 1958    2 Sheets-Sheet 2
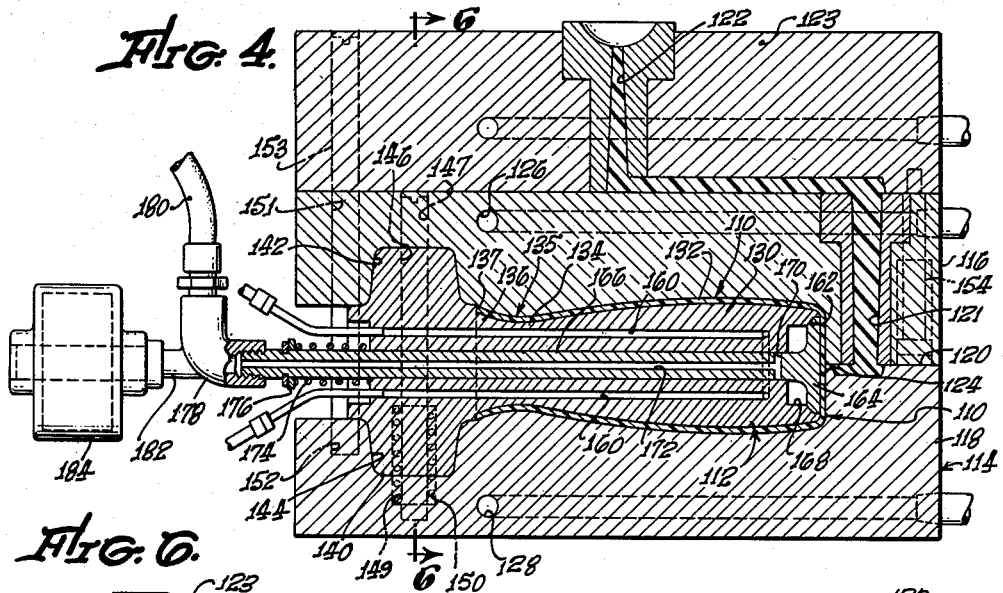
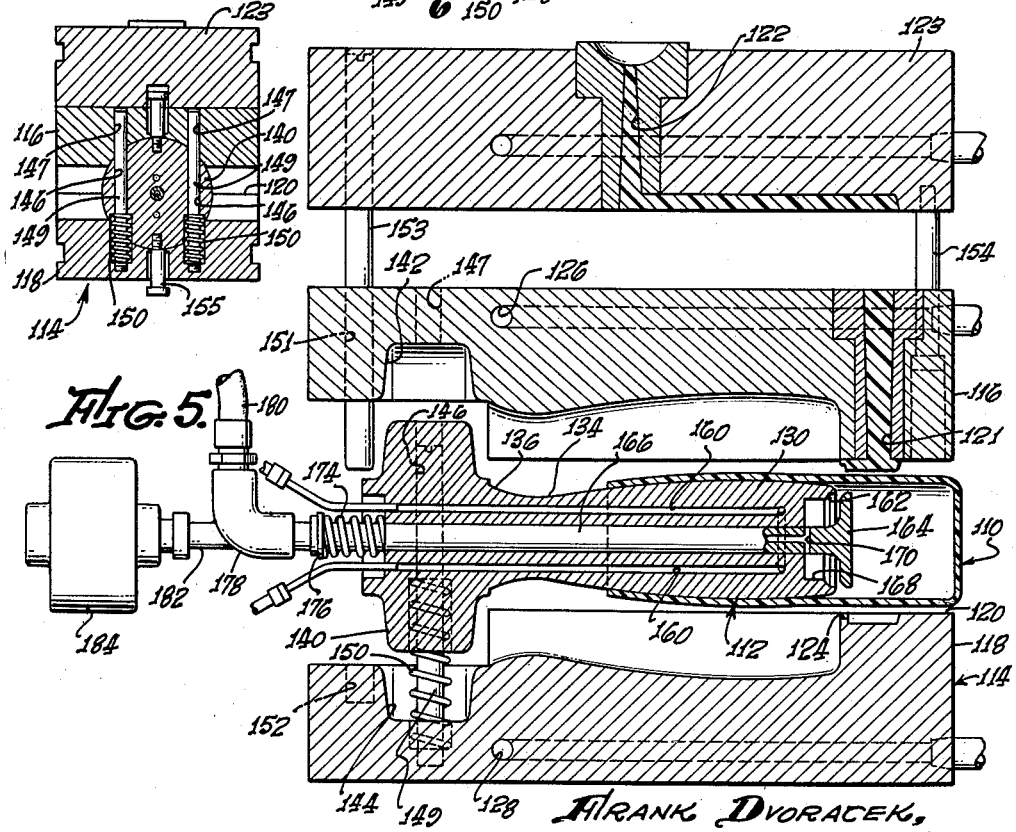
Frank Dvoracek,
INVENTOR.
By His Attorneys
Harris, Kiech, Foster & Harris.

United States Patent Office 3,183,292
Patented May 11, 1965

3,183,292
PLASTIC MOLDING APPARATUS AND METHOD
Frank Dvoracek, 728 E. Fairmount, Burbank, Calif.
Continuation of application Ser. No. 765,704, Sept. 30, 1958. This application May 25, 1962, Ser. No. 199,561
3 Claims. (Cl. 264—335)

The present application is a continuation of my copending application Serial No. 765,704, filed September 30, 1958, which in turn is a continuation-in-part of my first filed application Serial No. 499,070, filed April 4, 1955.

The present invention relates in general to the manufacture of elastomeric articles, the term "elastomeric," as used herein, being defined as having reference to materials which are relatively readily deformable, but which are sufficiently elastic or resilient to resume their original configurations after deformation unless subjected to stresses beyond their yield points. Numerous materials fall into this general category, among these being such plastic materials as polyethylene, which are normally not used and known, as is rubber, for their elasticity. For convenience, the invention will be considered herein as applied to the manufacture of polyethylene articles, although it will be understood that various features of the invention are applicable to articles of other materials coming within the scope of the foregoing definition of the term "elastomeric."

The invention is particularly adapted to molding elastomeric articles and will be considered herein in connection with manufacturing a polyethylene article by a molding operation, although it will be understood that the invention is not to be regarded as limited entirely thereto since various features of the invention are applicable to the manufacture of articles of other suitable plastic materials and by operations other than molding operations. For example, various features of the invention find utility in connection with the manufacture of articles by dipping or spraying operations.

However, since the presently preferred embodiments of the invention involve molding, the invention will be considered herein in connection with the manufacture of molded articles and, particularly, a bottle, or the like, of molded polyethylene, such an article having an enlarged body portion and a reduced neck portion which terminates in an open end or mouth.

Considering the present invention generally in connection with the preferred embodiments hereinbefore mentioned, the invention contemplates forming and setting the bottle, or similar article, in a mold cavity between a core having an external configuration conforming to the internal configuration desired for the bottle and a mold having an internal configuration conforming to the external configuration desired for the bottle. More particularly, the invention contemplates utilizing a solid core, i.e., a core which is noncollapsible, and a mold which is split into two longitudinal halves in a plane containing the axis of the bottle.

A primary object of the invention is to provide a method of making an elastomeric article, such as a bottle having a reduced neck portion, with a mold of the foregoing character which includes the steps of placing the mold halves together with the core in position therebetween so as to leave a space between the mold halves and the core corresponding substantially to the thickness of the bottle desired, forcing into this space under pressure a material which, when set, is elastomeric and forms the elastomeric bottle, causing relative movement between the mold halves and between the mold halves and the core to separate the mold halves a distance greater than the greatest transverse dimension of the bottle so as to free the bottle from the cavity, and introducing a fluid under pressure through the core and into the bottle between it and the core to stretch the neck portion of the bottle over the body portion of the core and to blow the bottle off the core.

Thus, the invention removes the molded article from the mold and the core merely by first separating the mold halves and removing the article and core from the mold cavity, and then blowing the article off the core, no collapsible core being needed.

An important object of the present invention is to provide a method of and apparatus for removing or stripping the bottle, or other article, from the core without, or substantially without, any permanent deformation of the bottle.

More particularly, an object is to remove the bottle from the core by stretching the neck portion of the bottle over the body portion of the core while, at the same time, preventing substantial enlargement of the body portion of the bottle.

Still more particularly, an object of the invention is to remove the bottle from the core by introducing a fluid such as air into the bottle and between the bottle and the core so that the neck portion of the bottle stretches to enable it to pass over the body portion of the core, at the same time restraining the body portion of the bottle against substantial enlargement under the influence of the pressure developed within the bottle to blow it off the core. With this procedure, the stretching of the neck portion of the bottle as it passes over the body portion of the core is insufficient to permanently deform, or appreciably permanently deform, the neck portion of the bottle.

Another object of the invention is to place over the body portion of the bottle a rigid guard which closely fits the body portion and which has an internal configuration corresponding to the external configuration of the body portion of the bottle. Thus, when fluid under pressure is introduced into the bottle to blow it off the core, the body portion of the bottle is expanded slightly into engagement with the interior of the guard, the guard restraining the body portion of the bottle against substantial enlargement so as to prevent or minimize permanent deformation of the body portion of the bottle. No guard over the neck portion of the bottle is necessary since I have found that the neck portion of the bottle will not stretch more than required to pass over the body portion of the core.

With the present invention, as fast as the bottles, or other elastomeric articles, are formed and set on the cores, they may be blown off the cores with the enlargement-restraining guards thereon, the guards subsequently being removed. Thus, the present invention provides a rapid and effective procedure for stripping elastomeric articles from cores, regardless of the manner in which they are formed on the cores, with little or no permanent deformation of the articles, which is an important feature of the invention.

The foregoing objects, advantages and features of the present invention, together with various other objects, advantages and features thereof which will become apparent, may be attained with the exemplary methods and apparatuses which are illustrated in detail in the accompanying drawings and which are described in detail hereinafter. Referring to the drawings:

FIG. 4 is a longitudinal sectional view of another embodiment of the invention and illustrating an operable mold of the invention in closed condition;

FIG. 5 is a view similar to FIG. 4, but showing the mold in open condition; and

FIG. 6 is a transverse sectional view taken along the arrowed line 6—6 of FIG. 4.

Figure 1:
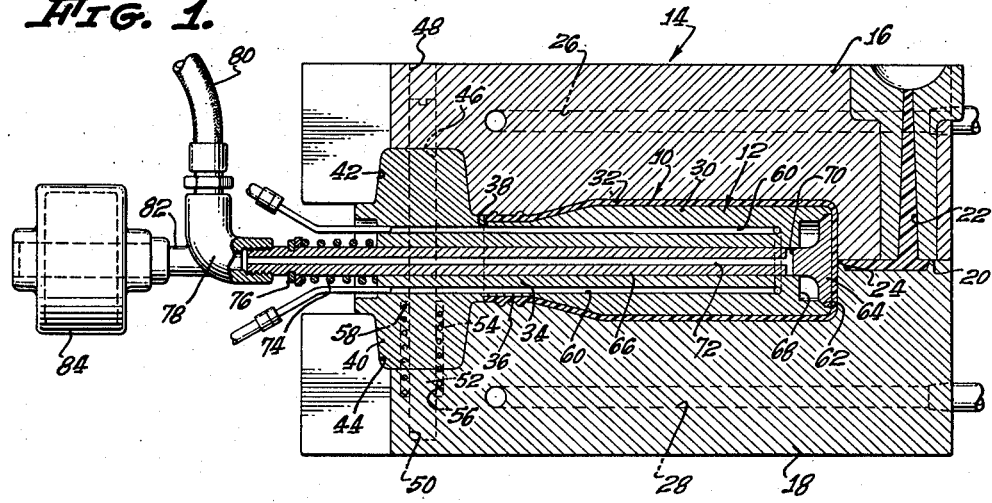
FIG. 1 is a longitudinal sectional view illustrating the formation of a baby's nursing bottle of polyethylene by a molding operation in a mold cavity between a solid core and an openable mold.
Figure 2:
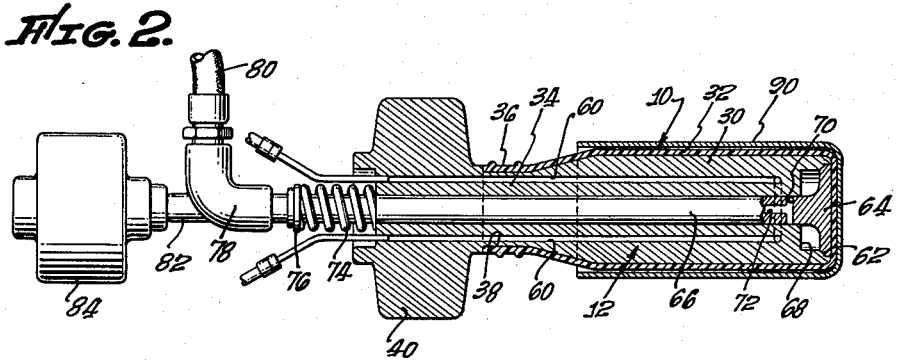
FIG. 2 is a longitudinal sectional view showing a guard for preventing substantial enlargement of the body portion of the bottle placed over the body portion of the bottle after opening of the mold, the mold being omitted from FIG. 2 (and from FIG. 3) for convenience.
Figure 3:
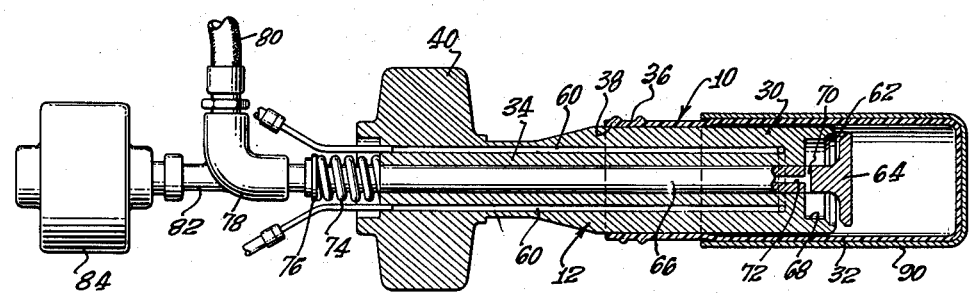
FIG. 3 is a longitudinal sectional view illustrating the manner in which the bottle and the guard are blown off the core by a fluid under pressure introduced into the bottle.

Referring to FIGS. 1 to 3 of the drawings, the numeral 10 designates a bottle of polyethylene, or other suitable elastomeric material as defined above, formed by an injection molding operation between a solid core 12 having an external configuration conforming to the internal configuration desired for the bottle 10 and a mold 14 having an internal configuration conforming to and uniformly spaced from the external configuration desired for the bottle.

The mold 14 is formed in two longitudinal parts or halves 16 and 18 having a longitudinal parting plane 20 preferably coinciding with the median plane of the bottle 10 and containing the axis of the bottle. The mold part 16 is shown as provided with an injection passage 22 communicating with a suitable injection molding machine, not shown. The injection passage 22 communicates with the cavity between the mold 14 and the core 12, the usual gate 24 being provided. The mold parts 16 and 18 are provided with the usual fluid circulation passages 26 and 28 for temperature control during molding and setting or curing of the bottle 10.

The core 12 is provided with a body portion 30 conforming to a body portion 32 of the bottle 10, the core tapering down to a reduced neck portion 34 conforming to a neck portion 36 of the bottle. Where the mold is closed over the core, the two are uniformly spaced, as illustrated, to provide for a hollow molded article of uniform wall thickness. Outwardly of the open end or mouth 38 of the bottle 10 the core 12 is provided with a head 40 which fits into complementary cavities 42 and 44 in the mold parts 16 and 18 to properly position the core 12 in the mold cavity. One or more bores 46 through the head 40 of the core register with one or more bores 48 in the mold part 16 and one or more bores 50 in the mold part 18 to receive one or more guide pins 52 for the core 12 and the mold parts 16 and 18. The bore or bores 46 and the bore or bores 50 are counterbored, at 54 and 56, respectively, to receive a spring or springs 58. When the mold parts 16 and 18 are separated, not shown, the spring or springs 58 displace the core 12 upwardly from the mold part 18 to lift the bottle 10 out of the mold cavity in the lower mold part 18, the guide pins 52 maintaining the core and the two mold parts in alignment as this is done.

The core 12 is provided with the usual fluid circulating passages 60 for temperature control during molding and setting or curing of the bottle 10. At its inner end the core 12 is provided with a valve seat 62 for a poppet valve 64 having a stem 66 which extends axially through the core and projects beyond the outer end thereof. Outwardly of the valve seat 62 is a chamber 68 with which a transverse passage 70 in the valve stem 66 communicates upon unseating of the valve, the transverse passsage 70 communicating with an axial or longitudinal passage 72 through the valve stem 66. The valve 64 is biased closed by a compression spring 74 seated at one end against the outer end of the core 12 and at its other end against a spring seat 76 on the valve stem. Connected to the outer end of the valve stem 66 is a fitting 78 communicating between the longitudinal passage 72 and a line 80 leading to a source of fluid, such as air, under pressure. The fitting 78 is provided with a boss 82 engaged by a solenoid 84, or other means for axially moving the valve stem 66 to unseat the valve 64.

Considering simultaneously the mode of operation of the apparatus disclosed and the method of the present invention, with the core 12 and the mold 14 assembled as shown in FIG. 1 of the drawings, uncured polyethylene, or other uncured plastic material as defined, which is elastomeric when set, is injected into the space between the core 12 and the mold 14 to form the bottle 10, suitable mold and injection temperatures being employed. These temperatures are well known for the various materials which may be utilized in accordance with the present invention so that a recitation thereof herein is thought to be unnecessary. After the bottle has been molded in the foregoing manner, the core 12 and the mold 14 are heated or cooled to set or cure the elastomeric material of which the bottle is formed.

After heating or cooling of the core 12 and the mold 14 to set the bottle 10, the mold 14 is opened and the bottle and the core are freed from the mold cavity by relatively moving the core and the mold halves 16 and 18 until the bottle and the core are clear of the mold halves, the mold being omitted from FIGS. 2 and 3 of the drawings for the sake of clarity. As previously described, the spring or springs 58 displace the core 12 and the bottle 10 thereon upwardly from the lower mold part 18 to remove the bottle and the core from the cavity in this mold part.

The next step, as shown in FIG. 2 of the drawings, is to telescope over the body portion 32 of the bottle 10 a rigid guard 90, the internal configuration of which conforms to the external configuration of the body portion of the bottle, the guard 90 thus being cup-shaped in the particular environment illustrated. The guard 90 fits the body portion 32 of the bottle 10 closely.

Referring to FIG. 3 of the drawings, with the guard 90 telescoped over the body portion 32 of the bottle 10, the solenoid 84, or other means, is energized to unseat the valve 64. Unseating the valve 64 causes it to engage the bottom wall of the bottle 10 to displace the bottle axially of the core 12, and also admits air, or other fluid, under pressure into the bottle 10 between the core 12 and the bottle. As air, or other fluid, under pressure is thus admitted into the bottle 10, it further displaces the bottle axially of the core 12 until the bottle is blown off the core. As clearly shown in FIG. 3 of the drawings, as the bottle 10 is displaced axially of the core 12, the neck portion 36 of the bottle stretches as it engages the tapered portion of the core 12 leading to the body portion 30 thereof, thereby providing a substantially fluid-tight seal to maintain pressure within the bottle until the bottle is completely blown off the core. At the same time, the guard 90 restrains the body portion 32 of the bottle 10 against substantial enlargement to prevent ballooning thereof, and, thus, to prevent or minimize permanent deformation of the body portion of the bottle. I have found that such restraint for the neck portion 36 of the bottle 10 is unnecessary since the neck portion does not tend to enlarge farther than is necessary for it to pass over the body portion 30 of the core 12. However, if restraint against excessive enlargement of the neck portion 36 of the bottle 10 due to the internal pressure is desired, the guard 90 may be extended to enclose the neck portion of the bottle as well.

Both the bottle 10 and the guard 90 are blown off the core 12 together, and may be discharged into a suitable receptacle, not shown. Thereafter, the guards may be retrieved for reuse in making additional bottles 10 with the procedure hereinbefore outlined.

I have found that such articles as the molded polyethylene nursing bottle shown may be removed from solid cores in accordance with the present invention with little or no permanent deformation of the articles. The temperature of the article required for zero or minimum permanent deformation upon removal from a core in the manner described varies with the elastomeric material of which the article is formed, the relationships between temperature and permissible deformation to prevent or minimize permanent deformation for various suitable elastomeric materials being well known. For example, this information for polyethylene may be found under the heading "Polyethylene" in volume 10 of the "Encyclopedia of Chemical Technology," edited by Raymond E. Kirk and Donald F. Ofmer, published by The Interscience Encyclopedia, Inc., and copyrighted in 1953 by The Interscience Encyclopedia, Inc.

Turning now to FIGS. 4 to 6 of the drawings, the numeral 110 designates an article of polyethylene, or similar elastomeric plastic material as defined, formed by an injection molding operation between a solid core 112 having an external configuration conforming to the internal configuration desired for the article 110 and a mold 114 providing a mold cavity having an internal configuration conforming to the external configuration desired for the article, the latter being a drinking vessel, vase, or similar item. The core and mold are uniformly spaced, as shown. The mold 114 includes two longitudinal halves 116 and 118 having a parting plane 120 which includes the axis of the article 110. The mold half 116 is provided with an injection passage 121 which communicates with a sprue passage 122 in a sprue bushing carried by a sprue plate 123, a gate 124 being provided between the injection passage 121 and the space between the walls of the mold cavity provided by the mold 114 and the core 112. The mold halves 116 and 118 are provided with fluid passages 126 and 128 for temperature control during molding and setting or curing of the article 110.

The core 112 is provided with a body portion 130 conforming to a body portion 132 of the article 110, the core tapering down to a reduced neck portion 134 conforming to a neck portion 135 of the article, and including a flared portion 136 conforming to a flared mouth or mouth portion 137 of the article. Outwardly of the flared mouth 137 of the article 110 the core 112 is provided with a head 140 which fits into complementary cavities 142 and 144 in the mold halves 116 and 118 to properly position the core 112 in the mold cavity. Bores 146 through the head 140 of the core 112 register with bores 147 in the mold half 116 and these bores receive guide pins 149 carried by the mold half 118. The head 140 and the mold half 118 are counterbored to receive springs 150 which surround the guide pins 149 and which displace the core 112 upwardly out of the portion of the mold cavity which is formed in the mold part 118, the guide pins 149 maintaining the mold half 118 and the core 112 in alignment as this is done. The mold halves 116 and 118 are also provided with registering bores 151 and 152 for guide pins 153 which are carried by the sprue plate 123 and which guide the mold half 116 as it is moved toward and away from the sprue plate in opening and closing the mold 114, the guide pins 153 aligning the sprue plate and the upper and lower mold halves 116 and 118 when the mold is closed. A stop and guide pin 154 carried by the sprue plate 123 and engageable with the upper mold half 116 limits movement of the upper mold half away from the sprue plate. Another stop and guide pin 155 carried by the head 140 of the core 112 serves to limit opening movement of the mold half 118 away from the mold half 116.

The core 112 is provided with fluid passages 160 for temperature control during molding and setting or curing of the article 110. At its inner end the core 112 is provided with a valve seat 162 for a poppet valve 164 having an axial stem 166 which projects beyond the outer end of the core. Outwardly of the valve seat 162 is a chamber 168 with which a transverse passage 170 in the valve stem communicates upon unseating of the valve, the transverse passage 170 communicating with an axial or longitudinal passage 172 through the valve stem 166. The valve 164 is biased closed by a compression spring 174 seated at one end against the outer end of the core 112 and at its other end against a spring seat 176 on the valve stem. Connected to the outer end of the valve stem 166 is a fitting 178 communicating between the longitudinal passage 172 and a line 180 leading to a source of fluid, such as air, under pressure. The fitting 178 is provided with a boss 182 engaged by a solenoid 184, or other means for axially moving the valve stem 166 to unseat the valve 164.

Considering simultaneously the mode of operation of the apparatus disclosed in FIGS. 4 to 6 and the method of the present invention as disclosed therein, uncured polyethylene, or other uncured material which is elastomeric when set, is injected into the space of uniform width between the core 112 and the mold 114, while the mold is closed as shown in FIG. 4, to form the article 110, suitable mold and injection temperatures being employed. After the article 110 has been molded in this manner, the core 112 and the mold 114 are heated or cooled to set or cure the eleastomeric material of which the article is formed.

After setting the article 110, the mold 114 is opened, as shown in FIG. 5, the entire outer mold is removed by moving the upper mold half 116 downwardly away from the sprue plate 123 and by moving the lower mold half 118 downwardly away from the upper mold half, the springs 150 displacing the core 112 and the article 110 upwardly out of the portion of the mold cavity in the lower mold half 118 to remove the article and the core from the cavity in this mold half.

The next step with the particular embodiment of the method of the invention which is shown in FIGS. 4 to 6 of the drawings is to energize the solenoid 184, or other means for unseating the valve 164. Unseating this valve causes it to engage the bottom wall of the article 110 to displace the article axially of the core 112, and also admits air, or other fluid, under pressure into the article 110 between it and the core 112. Such fluid under pressure further displaces the article axially of the core 112 until the article is blown off the core. As clearly shown in FIG. 5 of the drawings, as the article 110 is displaced axially of the core 112, the neck portion 135 of the article stretches and tightly engages the body portion 130 of the core, thereby providing a substantially fluid-tight seal to maintain pressure within the article until it is blown completely off the core.

It will be noted that with the article 110, no guard corresponding to the guard 90 is utilized. The reason is that the diameter of the neck portion 135 of the article 110 is large enough and the diameter differential between the body portion 132 of the article and the neck portion 135 thereof is small enough that excessive deformation of the body portion of the article will not occur in this instance even without a guard. Thus, with this embodiment of the invention, it is merely necessary to relatively move the mold halves 116 and 118 and the core 112 until the article 110 is clear of the mold halves, i.e., until the spacing between the mold halves is greater than the greatest transverse dimension of the article, and then blow the article off the core.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. A method of removing a hollow, elastomeric article having an open end from a core which extends into said article through said open end thereof and which has an external configuration conforming to the internal configuration of said article, including the steps of: placing over at least a portion of said article a guard having an internal configuration conforming to the external configuration of said portion of said article and closely fitting said portion of said article; and introducing a fluid into said article through said open end thereof and between said article and said core to blow said article off said core, said guard restraining said portion of said article against substantial enlargement while said article is being blown off said core, and said guard being blown off said core with said article.

2. In an apparatus for removing a hollow, elastomeric article having an open end from a core having an external configuration conforming to the internal configuration of said article, the combination of: a guard telescoped over at least a portion of said article and having an internal configuration conforming to the external configuration of said portion of said article, said guard closely fitting said portion of said article; and means, including a passage in said core, for introducing a fluid into said article through said open end thereof and between said article and said core to blow said article off said core, said guard restraining said portion of said article against substantial enlargement while said article is being blown off said core, said guard being blown off said core with said article.

3. A method of removing a hollow, elastomeric article from a core on which the article is formed, including the steps of: placing over at least a portion of the article a guard which closely fits said portion of the article and which has an internal configuration corresponding to the external configuration of said portion of the article; expanding said portion of the article within said guard with said guard in place over said portion of the article so as to disengage said portion of the article from said core, whereby said guard restrains said portion of the article against substantial enlargement; and displacing the article and said guard off said core with said guard in place on said portion of said article.

References Cited by the Examiner
UNITED STATES PATENTS 2,124,871   7/38   Beal.
2,298,716   10/42   Mooreland et al.
2,396,406   3/46   Anderson.

ROBERT F. WHITE, *Primary Examiner.*

WILLIAM J. STEPHENSON, ALEXANDER H. BRODMERKEL, *Examiners.*